United States Patent [19]
Yamashita et al.

[11] Patent Number: 6,084,328
[45] Date of Patent: Jul. 4, 2000

[54] MOTOR AND A HEAT SINK APPARATUS USING THE SAME

[75] Inventors: Akitomo Yamashita; Eiichirou Nakazono, both of Usa, Japan

[73] Assignee: Matsushita Electric Industrial Co., Ltd., Osaka, Japan

[21] Appl. No.: 09/253,142

[22] Filed: Feb. 19, 1999

[30] Foreign Application Priority Data

Feb. 27, 1998 [JP] Japan .................................. 10-046975

[51] Int. Cl.[7] ...................................................... H02K 7/08
[52] U.S. Cl. .................................................. 310/90; 310/63
[58] Field of Search .................................. 310/90, 91, 58, 310/60 R, 63; 384/100, 107, 114, 115, 121

[56] References Cited

U.S. PATENT DOCUMENTS 5,701,045  12/1997  Yokozawa et al. ......................... 310/62
5,925,949   7/1999  Jung et al. .............................. 310/67 R

FOREIGN PATENT DOCUMENTS 6358283  1/1982  Japan ............................... F16C 17/02
 71528   7/1990  Japan ............................... F16C 32/00
Y271528  7/1990  Japan ............................... F16C 32/00

OTHER PUBLICATIONS

JP Abstract 57–15120, Tamaki "Dynamic Pressure Type Spindle Unit", Jan. 26, 1982.

*Primary Examiner*—Nestor Ramirez
*Assistant Examiner*—Burton S. Mullins
*Attorney, Agent, or Firm*—Stevens, Davis, Miller & Mosher, L.L.P.

[57] ABSTRACT

The motor and the heat sink apparatus using the motor according to the present invention include a frame having a cup-shaped frame housing; a stator mounted to an outer circumference of the frame housing; a sleeve fitted into the frame housing such that one end of the sleeve is supported on a seat formed inside the frame housing; a shaft rotatably fitted into the sleeve; a rotor having a magnet disposed opposite to the stator; oil filled into a clearance between the shaft and the sleeve; and a fixing ring inserted into the frame housing to hold the sleeve against the seat. Because the sleeve is fixedly sandwiched between the seat and the fixing ring, the stress acting on the sleeve in the radial direction is reduced, preventing an inner diameter deformation of the sleeve. This in turn produces a quiet motor with a long life and a heat sink apparatus incorporating this motor which is small, quiet, of long-life and excellent in cooling efficiency.

18 Claims, 8 Drawing Sheets

MOTOR AND A HEAT SINK APPARATUS USING THE SAME

BACKGROUND OF THE INVENTION

1. Field of the Invention

The present invention relates to a motor with a dynamic pressure type fluid bearing and to a heat sink apparatus using the motor.

2. Description of the Prior Art

FIGS. 8 and 9 show the arrangement of a conventional heat sink apparatus using a motor with a dynamic pressure fluid bearing.

FIG. 8 is a cross section of the conventional heat sink apparatus for cooling semiconductors, FIG. 9 is a cross section of a bearing portion of the motor used in the heat sink apparatus of FIG. 8, and FIG. 10 shows the state of deformation of a sleeve in the motor of FIG. 8.

As illustrated in FIGS. 8–10, a cup-shaped frame housing 1a is protrudingly formed in a recessed portion of a frame 1, around which housing a drive printed circuit board 4 with a Hall device is mounted on a stator 3 around which a coil 2 is wound. The stator 3 is fixedly secured to the outer circumference of the frame housing 1a, with an insulation sheet 20 being provided between the drive printed circuit board 4 and the frame 1. A thruster 5 made of, for instance, resin is fixedly secured to the bottom of the frame housing 1a. A bell mouth 19 is fixed to the outer circumference of the frame 1 to obtain a smooth air flow. A sleeve 6 is fixedly press-fitted into the frame housing 1a to form a stator unit 15.

A fan 8 is integrally formed with a shaft 9 to which a washer 10 is attached to prevent the fan 8 from coming off. The shaft 9 engages with the thruster 5 and is rotatably fitted in the sleeve 6. The fan 8 has a magnet 11 and a magnet yoke 12 both secured thereto in such a manner that they face the annular stator 3. The fan 8, the magnet 11 and the magnet yoke 12 together form a rotor 16.

As shown in FIG. 9, dynamic pressure generating grooves 13 are formed in the inner circumferential surface of the sleeve 6 by a ball rolling and the like, and is subjected to sizing whereby projections formed by the ball rolling are removed from the inner circumferential surface to thereby finish the inner circumferential surface with a high precision not more than ±2 μm.

Oil 14 is supplied to the dynamic pressure generating grooves 13 for lubrication and thus a radial bearing 17 is formed. The end face of the shaft 9, which is opposite to the fan 8, is surface-finished in a spherical shape and held in contact with the thruster 5 to form a thrust bearing 18.

SUMMARY OF THE INVENTION

The object of the present invention is to provide a motor that can prevent an inner diameter deformation of the sleeve and a leakage of oil from the bearing during rotation, and also a heat sink apparatus incorporating this motor, which apparatus has a high cooling efficiency.

To realize this objective, the motor of the present invention comprises: a frame having a cup-shaped frame housing; a stator mounted to an outer circumference of the frame housing; a sleeve fitted into the frame housing such that one end of the sleeve is supported on a seat formed inside the frame housing; a shaft rotatably fitted into the sleeve; a rotor having a magnet disposed opposite to the stator; oil filled into a clearance between the shaft and the sleeve; and a fixing ring inserted into the frame housing to hold the sleeve against the seat.

With this construction, because the sleeve is fixedly sandwiched between the seat and the fixing ring, the stress acting on the sleeve in the radial direction is reduced, preventing an inner diameter deformation of the sleeve.

Further, in the motor described above, an oil pool is formed around the base of the shaft to receive oil scattered from between the shaft and the sleeve.

Because oil scattered during rotation is collected in the oil pool, an oil leakage from the bearing during rotation can be prevented.

Next, the heat sink apparatus using the above-described motor can mount a heated body on the frame of the motor, has plate-like or pin-like fins protrudingly formed on the frame, and has one or more openings formed in a side wall of the frame of the motor. In this heat sink apparatus, the heat of the heated body is directly conducted to the frame of the motor and, as a result, the frame and the fins radiate the heat, and an air flow generated by the fan efficiently blows against the frame and fins so as to enhance the dissipation effect. Further, by optimally selecting the position, the size and the number of openings, it is possible to route the air flow onto other heated bodies or to smoothly exhaust the heated air.

DESCRIPTION OF THE PREFERRED EMBODIMENTS

Figure 1:
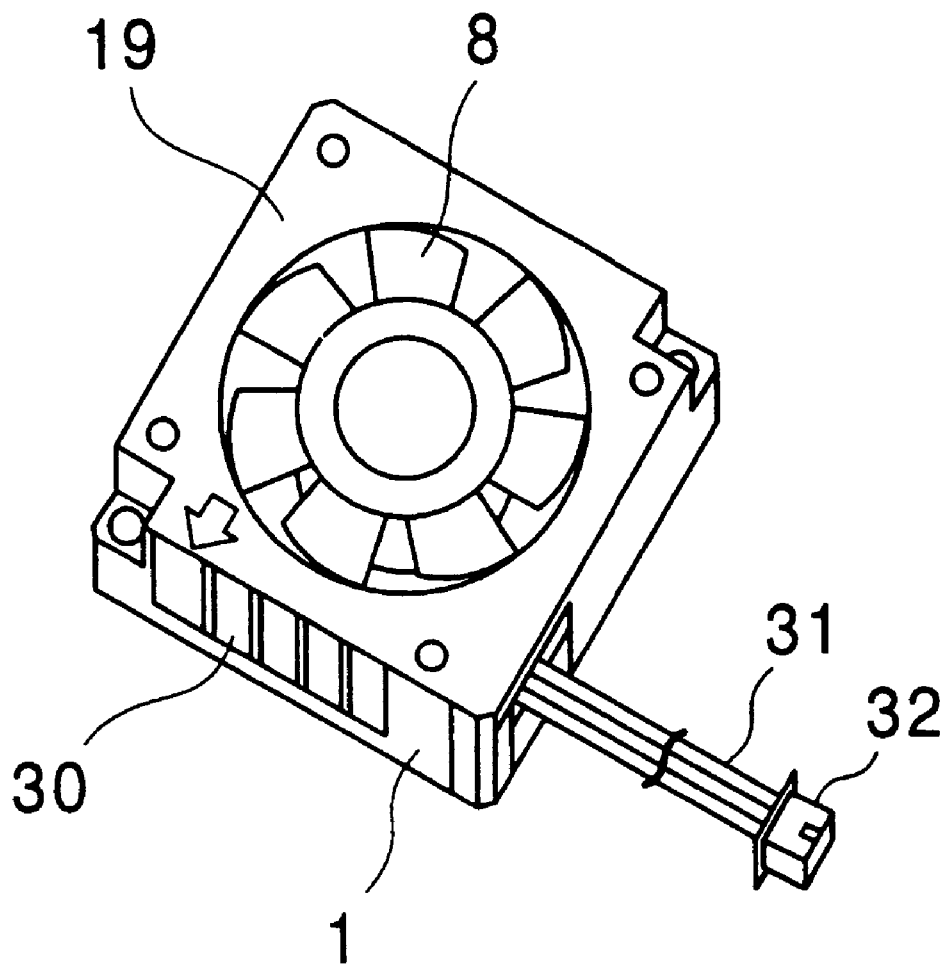
FIG. 1 is a perspective view of a heat sink apparatus as one embodiment of the present invention.

Embodiments of the present invention will be described referring to the accompanying drawings. In these drawings, like members as those of the prior art apparatus are given like reference numerals and repetitive explanations are omitted.

FIG. 1 is a perspective view showing the heat sink apparatus as one embodiment of the present invention. The heat sink apparatus is placed over and thermally coupled to a semiconductor device (not shown) such as a CPU and the like so that heat of the semiconductor device is conducted to a metal frame 1 of the heat sink apparatus. A fan 8 generates an air flow as it rotates. The air is drawn into the heat sink apparatus from the upper surface thereof and, while the air contacts with the inner surface of the frame 1, is exhausted through an opening 30, thus dissipating heat from the frame 1. The frame 1 is fitted with a bell mouth 19 to make smooth the air flow generated by the rotation of the fan 8. Denoted 31 is a lead wire, one end thereof is connected through a hole or notch formed in a side wall of the frame 1 to a drive printed circuit board 4 and the other end thereof is connected to a connector 32. The lead wire 31 supplies electricity from a power source to the drive printed circuit board 4 and also transfers control information to and from a control means to control the heat sink apparatus via the lead wire 31. The heat sink apparatus is connected via the connector 32 to a printed circuit board of an electronic device.

Embodiment 1

Figure 2:
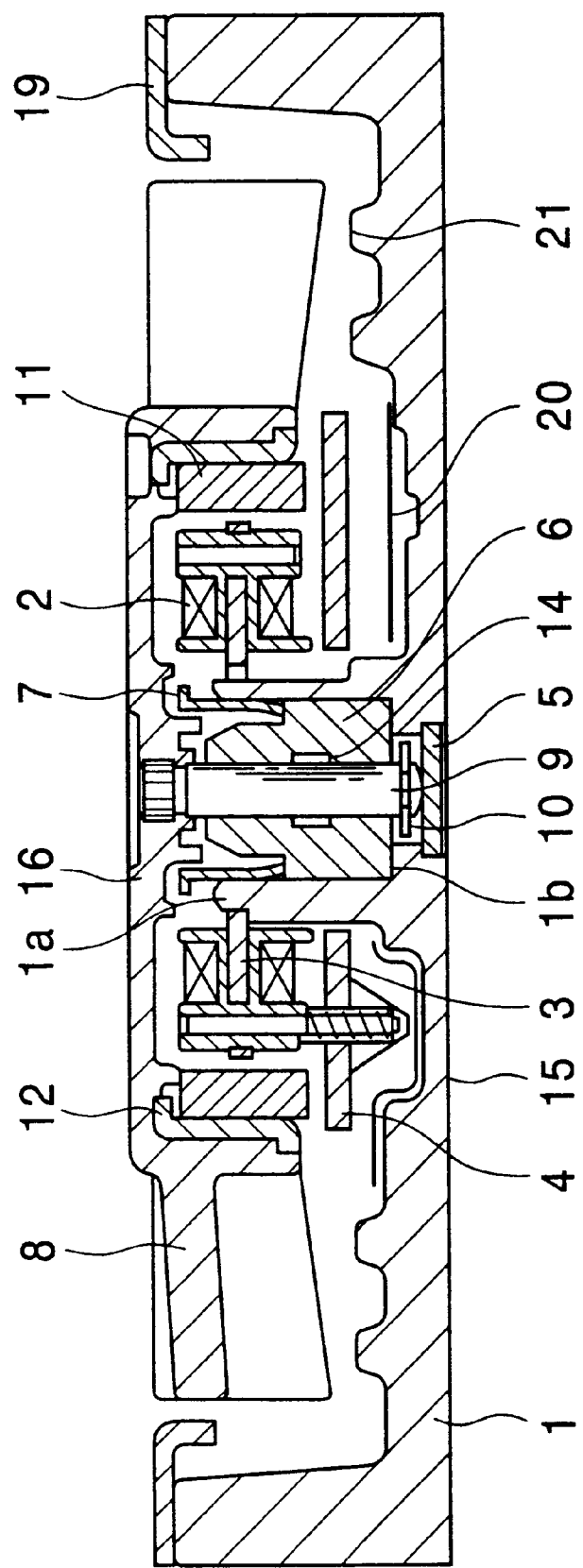
FIG. 2 is a cross section of the heat sink apparatus according to an embodiment 1 of the present invention.
Figure 3:
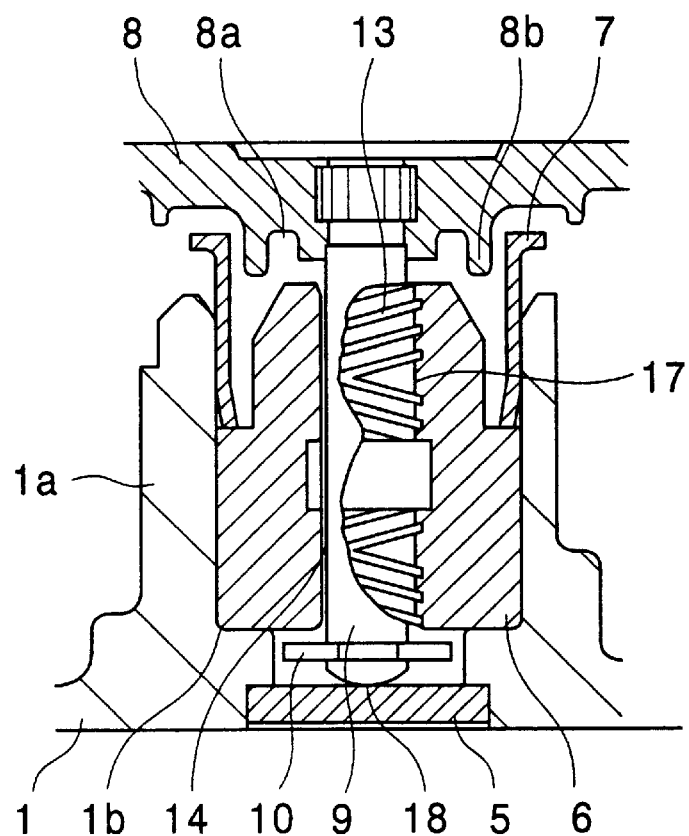
FIG. 3 is a cross section of a bearing portion of the motor used in the heat sink apparatus of FIG. 2.
Figure 4:
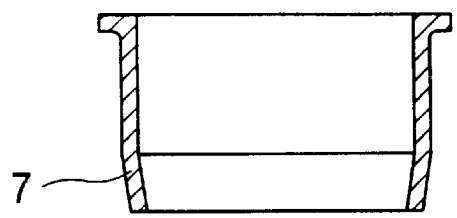
FIG. 4 is a cross section of a fixing ring mounted in the motor of FIG. 2.
Figure 5:
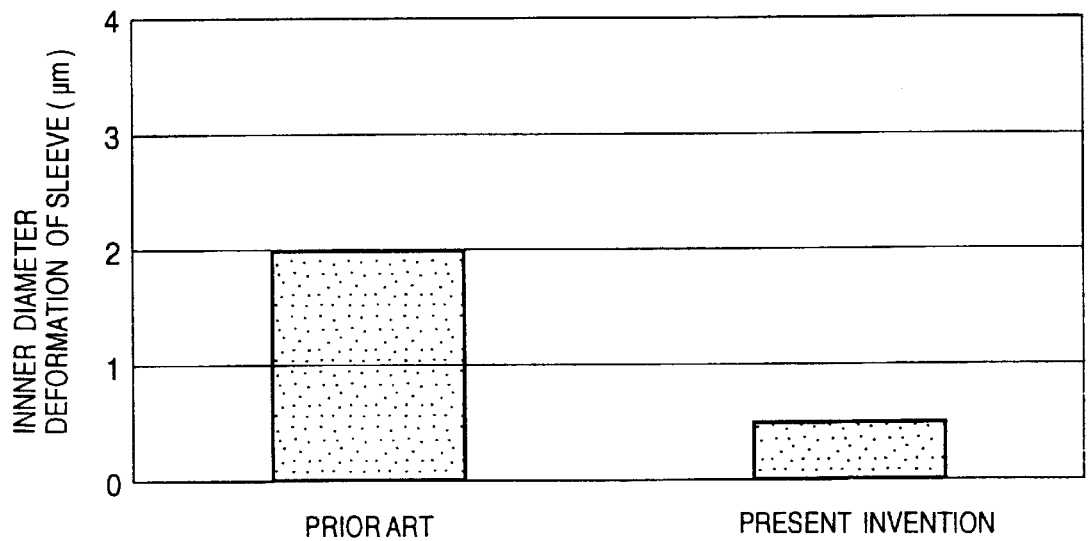
FIG. 5 is a graph showing inner diameter deformation of the sleeve used in the motor of FIG. 2 and in a conventional motor.

FIG. 2 is a cross section showing a heat sink apparatus according to an embodiment 1 of the present invention, FIG. 3 is a cross section showing a bearing portion of the motor used in the heat sink apparatus of FIG. 2, FIG. 4 is a cross section showing a fixing ring installed in the motor of FIG. 2; and FIG. 5 is a graph showing the amount of the inner diameter deformation of sleeve in the motor of FIG. 2 and in a conventional motor.

Each of the motors in the embodiments including the after-mentioned embodiments is intended for use in the heat sink apparatus for cooling semiconductors. As shown in FIG. 2, around a cup-shaped frame housing 1a which is protrudingly formed in a recessed portion of a frame 1, a drive printed circuit board 4 with a Hall device is installed on a stator 3 around which a coil 2 is wound. Fins 21 of plate-like, convex or pin-like are protrudingly formed on the recessed portion of the frame 1. A predetermined number of openings (not shown) of a predetermined size are formed through a side wall of the frame 1 in a predetermined direction to pass an air flow. A bottom of the frame 1 on the side to which the frame housing 1a is not provided has a flat surface region to which a heated body such as a semiconductor device can be attached. The stator 3 is fixedly secured to the outer circumference of the frame housing 1a, with an insulation sheet 20 being provided between the drive printed circuit board 4 and the frame 1. A thruster 5 made of, for example, resin is fixed to the bottom of the frame housing 1a. A bell mouth 19 is fixed to the side wall of the frame 1 to obtain a smooth air flow.

A seat 1b is formed in the frame housing 1a, which seat supports one end of a sleeve 6 fitted into the frame housing 1a. The sleeve 6 has a stepped portion formed on the other end side and also a tapered portion that becomes progressively narrow in diameter from the stepped portion toward the other end face. The sleeve 6 is either inserted into the frame housing 1a with a clearance of not more than 0.1 mm therebetween or lightly press-fitted into the frame housing 1a with an interference of not more than 5 $\mu$m. The frame housing 1a has a fixing ring 7 (FIG. 3) inserted therein which ring pushes down the stepped portion of the fitted sleeve 6 to hold one end of the sleeve 6 against the seat 1b. The frame housing 1a, the sleeve 6 and the fixing ring 7 together form a stator unit 15.

The circumferential surface of the fixing ring 7 on the insertion side is inclined inwardly at an angle between 5° and 15°, 10° in this embodiment, so that the fixing ring 7 can be easily press-fitted into the frame housing 1a. A flange is formed to the other end side of the fixing ring 7 to facilitate the pushing of the fixing ring 7 for insertion.

The fan 8 is integrally formed with the shaft 9, a washer 10 having slits formed thereto is press-fitted to the end face of the shaft 9, which is opposite to the fan 8, in order to prevent the fan 8 from coming off. The shaft 9 engages with the thruster 5 and is rotatably inserted in the sleeve 6. The fan 8 has a magnet 11 and a magnet yoke 12 both secured thereto, by an adhesive and the like, in such a manner that they face the annular stator 3. The fan 8, the magnet 11 and the magnet yoke 12 together form a rotor 16.

A portion of the fan 8 surrounding the base of the shaft 9 which extends from the fan 8 is formed with a recessed oil pool 8a that receives oil scattered from between the sleeve 6 and the shaft 9 during rotation. The volume of the oil pool 8a is equal to or larger than that of a clearance between the sleeve 6 and the shaft 9. A rib 8b on the outer side of the oil pool 8a is inserted into the inner surface of the fixing ring 7 so that a gap between the rib 8b and the inner surface of the fixing ring 7 is about 50–300 $\mu$m and an overlapping length is not less than 0.3 mm.

As shown in FIG. 3, dynamic pressure generating grooves 13 are formed in the inner circumferential surface of the sleeve 6 by ball rolling and the like to ensure smooth rotation of the shaft 9 and is also subjected to sizing to remove projections formed by the ball rolling and to finish the inner diameter of the sleeve with a high precision of not more than ±2 $\mu$m. Oil 14 is supplied to the dynamic pressure generating grooves 13 for lubrication to maintain a one-side bearing clearance of 2–12 $\mu$m between the grooves and the shaft 9, thus forming a radial bearing 17. The dynamic pressure generating grooves 13 may be formed in the outer circumferential surface of the shaft 9.

As detailed in FIG. 3, the end face of the shaft 9, which is opposite to the fan 8, is surface-finished in a spherical shape and held in contact with the thruster 5 to form a thrust bearing 18.

As for the material of the sleeve 6, copper alloys such as C3604 and BC6C and the like are used considering machinability and rollability. As for the material of the shaft 9, stainless steels such as SUS420J2 and the like are used in consideration of wear resistance and ease of handling. Fluorine synthetic oil is used as the oil 14 so that it can provide resistance against high temperature, since the fan motor is often mounted directly on the semiconductor and is close to the heat source. An additive is mixed to the oil to improve a pressure resistance to some extent.

With the above arrangement of the fan motor, the sleeve 6 is fixedly sandwiched between the seat 1b and the fixing ring 7, so that a stress acting on the sleeve 6 in the radial direction is reduced. As a result, as shown in FIG. 5, the amount of the inner diameter deformation of the sleeve can be reduced to approximately one fourth that of a conventional fan motor.

Figure 10:
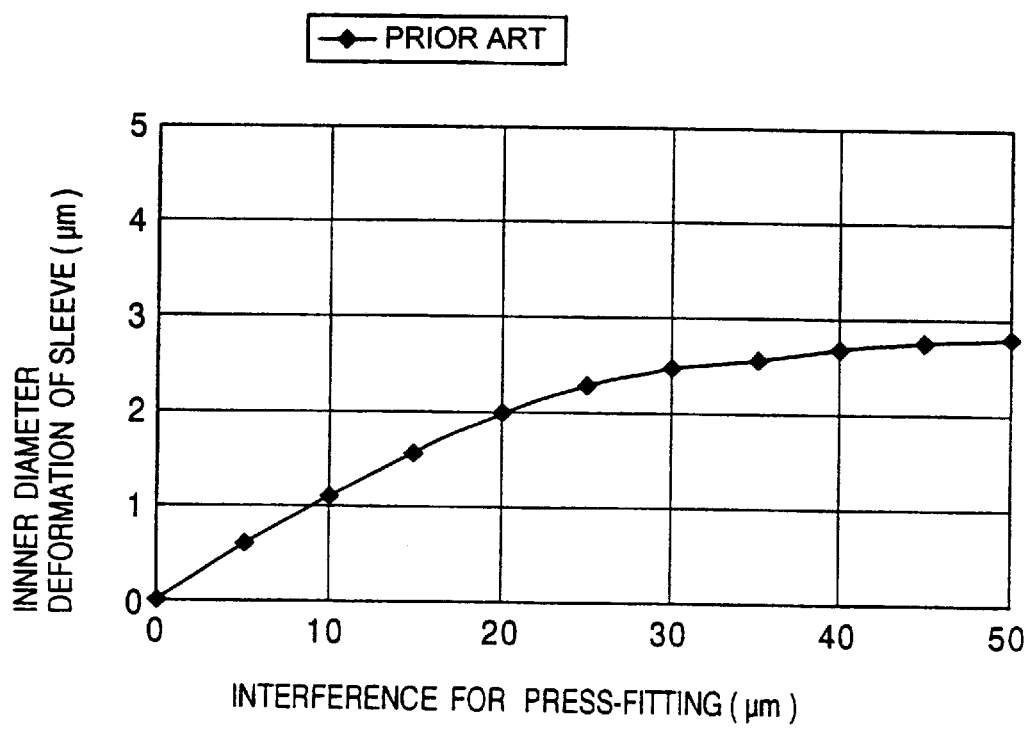
FIG. 10 is a graph showing an inner diameter deformation of the sleeve in the motor of FIG. 8.

If the clearance between the sleeve 6 and the frame housing 1a is set not less than 0.1 mm, the centers of the sleeve 6 and the stator 3 get out of alignment, causing problems such as rotation variations and the like. Further, if the press-fitting is performed with an interference of not less than 5 $\mu$m, the inner diameter of the sleeve 6 is deformed by not less than 0.6 $\mu$m (see FIG. 10). Considering these factors as well as machining variations, the sleeve 6 is inserted into the frame housing 1a with a clearance of not more than 0.1 mm or lightly press-fitted thereinto with an interference of not more than 5 $\mu$m.

Because the oil pool 8a having a volume equal to or greater than that of the clearance between the sleeve 6 and the shaft 9 is formed around the base of the shaft 9 and the rib 8b formed along the outer circumference of the oil pool 8a and the fixing ring 7 are facing with a narrow clearance of 50–300 $\mu$m therebetween, excess oil scattered from the bearing during rotation is positively received in the oil pool 8a, thus preventing the leakage of the oil used.

If the oil is rather insufficient due to evaporation and the like, since the excess oil is stored in the oil pool 8a near the sleeve, the oil is supplied as required to the bearing clearance where the surface tension is high, thereby preventing a lack of oil in the bearing.

When the clearance between the rib 8b and the fixing ring 7 is set to not less than 300 μm, the surface tension of the oil 14 that has flowed into this clearance decreases, which allows the oil 14 to pass through this clearance. Conversely, when the clearance is set to not more than 50 μm, the increase of the surface tension of the clearance causes the oil 14 to be drawn out, resulting in a lack of oil in the bearing and therefore an increase in the oil friction torque. For this reason, the rib 8b along the outer circumference of the oil pool 8a and the fixing ring 7 are disposed with the gap therebetween being of 50–300 μm so as to effectively prevent the outflow of the oil 14 and circulate the oil 14.

Next, the operation of the heat sink apparatus of this embodiment will be explained. When the motor rotates, the fan 8 also rotates to draw in air in a direction of shaft 9 of the motor. The air flows along an air passage formed by the fins 21 and is exhausted from the openings formed in the side wall of the frame 1. The air flow removes heat from the frame 1 and the fins 21, to which the heat of the heated body is being conducted, thus performing a cooling action on the heated body. The openings in the side wall are directed in one direction or a plurality of directions in alignment with an electronic device using the heat sink apparatus in order to direct the air exhausted from the heat sink apparatus to the other heat-generating elements or in order to smoothly discharge the heated air from the electronic device.

The fins 21 are not limited in shape to plates and pins but may take other forms such as triangular, wing-like, vortex, circular and radial shapes that have the similar actions and effects. When the heat sink apparatus is smaller than a predetermined size (40 mm square), the motor necessarily becomes smaller in size, which results in the decease of the power output thereof. Thus, in the above case, the power of forced air generated by the motor and the fan becomes smaller. In this case, protrudingly forming the fins further reduces the amount of air released and may even degrade the heat dissipation effect. When the size of the heat sink apparatus is in the range described above, it is therefore preferred to keep the amount of air as large as possible without protrudingly forming the fins to improve the heat dissipation effect.

Embodiment 2

Figure 6:
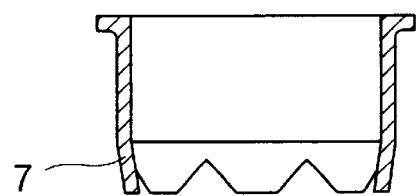
FIG. 6 is a fixing ring installed in the motor of an embodiment 2 of the present invention.

FIG. 6 is a cross section of a fixing ring installed in the motor according to an embodiment 2 of the present invention.

The fixing ring 7 of this embodiment differs from that of the embodiment 1 in that the end face of the fixing ring 7 in contact with the sleeve 6 has a serrated edge.

The uneven end face of the fixing ring 7 causes its raised (convex) portions to bite into the sleeve 6 when the fixing ring 7 is press-fitted into the frame housing 1a. The adhering force of the fixing ring 7 to the sleeve 6 increases and the sleeve 6 is prevented from becoming loose due to thermal impacts, vibrations and falling impacts. Accordingly, turning of the sleeve 6 together with the shaft 9, the increase of vibrations, seizure of the bearing and the like are effectively prevented. The one end face of the fixing ring 7 is not limited in shape to the serrated edge but may have other forms such as triangular or sawtooth shapes and the like as long as they have the similar actions and effects.

The material of the fixing ring 7 may be stainless steel such as SUS304, considering the spring property and machinability as well as the requirement of the fixing ring 7 being harder than the sleeve 6 so as to easily bite into the sleeve.

Embodiment 3

Figure 7:
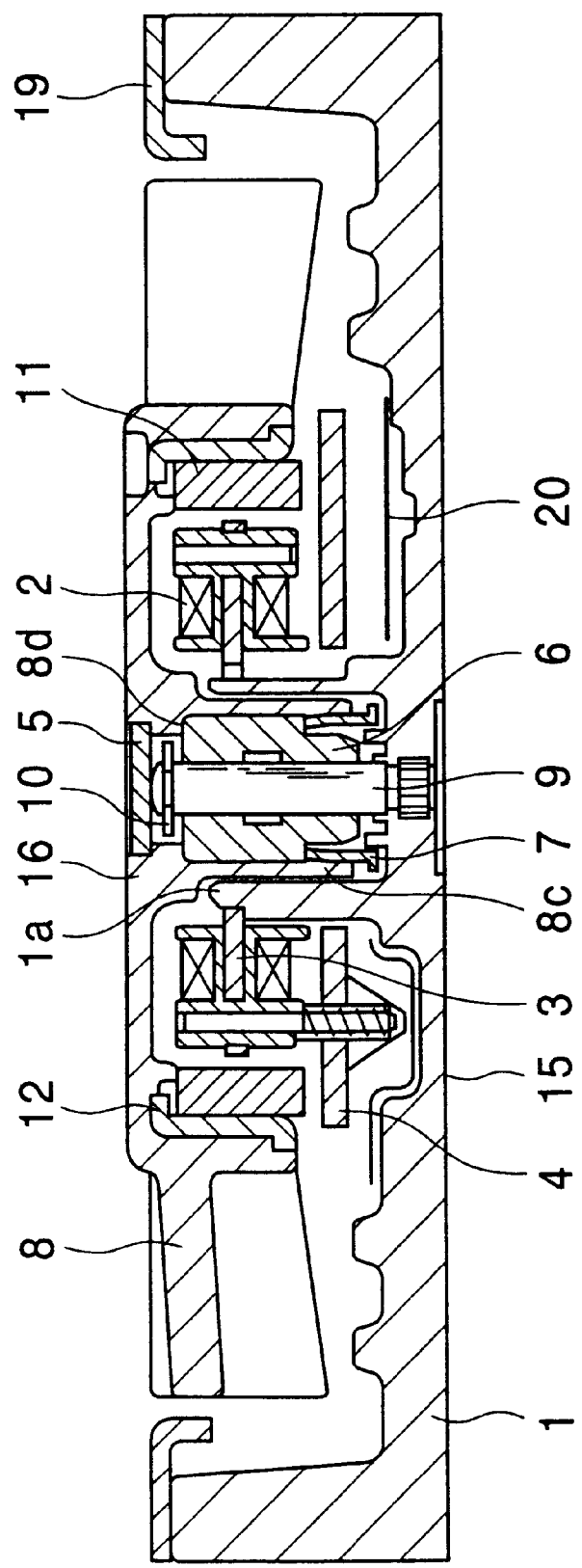
FIG. 7 is a cross section of the heat sink apparatus according to an embodiment 3 of the present invention.
Figure 8:
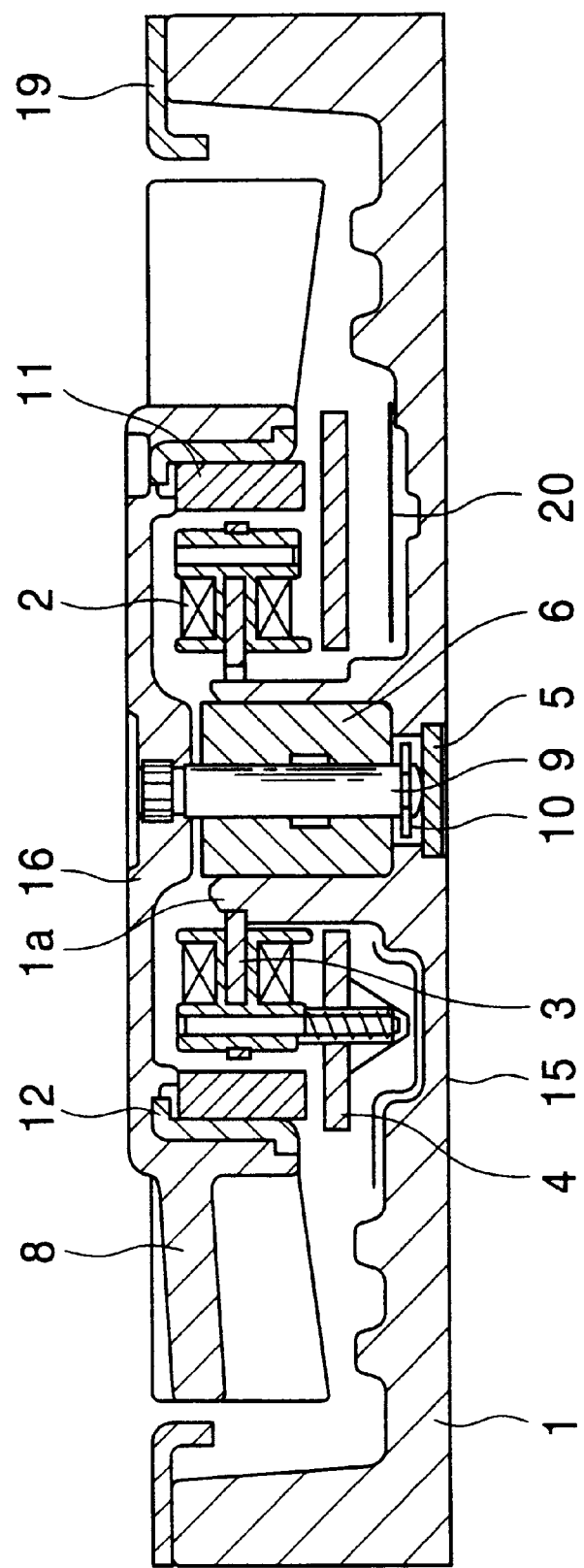
FIG. 8 is a cross section of a conventional heat sink apparatus for cooling semiconductors.
Figure 9:
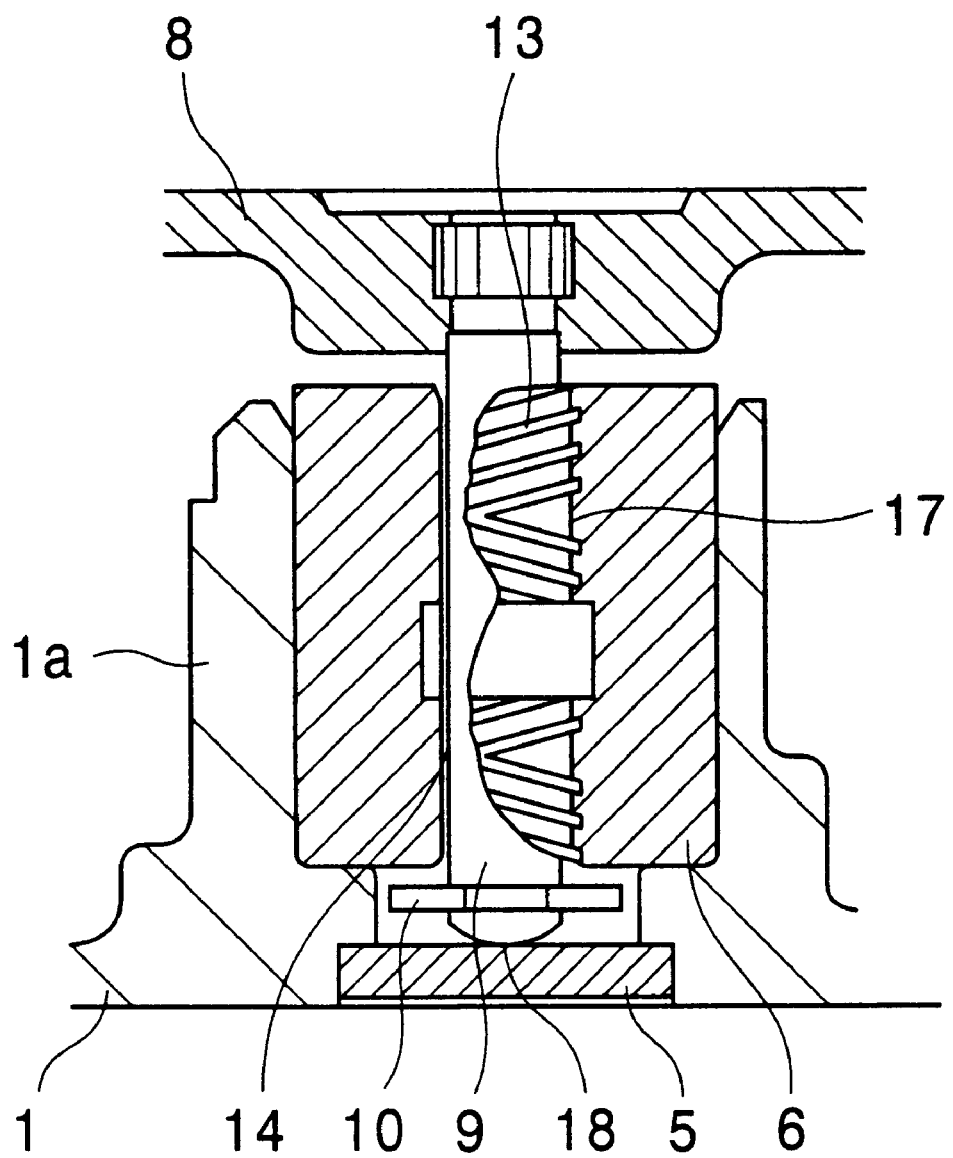
FIG. 9 is a cross section of a bearing portion of a motor used in the heat sink apparatus of FIG. 8.

FIG. 7 shows a cross section of a heat sink apparatus according to an embodiment 3 of the present invention.

As shown in FIG. 7, around a cup-shaped frame housing 1a which is protrudingly formed in the recessed portion of the frame 1, a drive printed circuit board 4 with a Hall device is installed on a stator 3 around which a coil 2 is wound. The stator 3 is fixedly secured to the outer circumference of the frame housing 1a, with an insulation sheet 20 being provided between the drive printed circuit board 4 and the frame 1. A bell mouth 19 is fixedly secured to an outer circumferential wall of the frame 1 to obtain a smooth air flow. Further, the sleeve 6 is rotatably fitted into a shaft 9. A washer 10 having slits formed thereto is press-fitted into an upper tip end of the shaft 9 to prevent the fan 8 from coming off to form a stator unit 15.

The fan 8 has a magnet 11 and a magnet yoke 12 both secured thereto, by an adhesive and the like, in such a way that they face the annular stator 3. The sleeve 6 is fitted into a cup-shaped rotor housing 8c which is protrudingly formed to the fan 8.

Further, a thruster 5 mode of resin is secured to the fan 8 with it being abutted against an upper tip end of the shaft 9. A seat 8d is formed in the rotor housing 8c, which seat supports one end of the sleeve 6 fitted into the rotor housing 8c. The sleeve 6 is either inserted into the rotor housing 8c with a clearance of not more than 0.1 mm or lightly press-fitted into the rotor housing 8c with an interference of not more than 5 μm.

A fixing ring 7a is inserted into the rotor housing 8c to hold the sleeve 6 against the seat 8d. These members together form a rotor 16 which is rotatably mounted through a bearing.

The circumferential surface of the fixing ring 7 on the insertion side is inclined inwardly at an angle of about 10° to ensure that the fixing ring 7 can easily be press-fitted into the rotor housing 8c.

With the fan motor of the above arrangement, because the sleeve 6 is fixedly sandwiched between the seat 8d and the fixing ring 7, as in the embodiment 1, so that a stress acting on the sleeve 6 in the radial direction is considerably reduced, the embodiment prevents the inner diameter deformation of the sleeve (see FIG. 4).

It should be noted that the present invention is not limited to the embodiments described above in terms of the structural feature of the heat sink apparatus, the structural feature and type of the motor used in the heat sink apparatus, the structural feature of the bearing, and the oil, and that various design modifications may be made without departing from the spirit of the invention. In the above embodiments, although the dynamic pressure generating grooves 13 are formed in the inner circumferential surface of the sleeve 6, it may be formed in the outer circumferential surface of the shaft 9.

What is claimed is:

1. A motor comprising:

a frame having a frame housing with a seat being formed inside;

a stator mounted to an outer circumference of the frame housing;

a sleeve fitted into the frame housing such that one end of the sleeve is supported on the seat formed inside the frame housing;

a shaft rotatably fitted into the sleeve;

a rotor having a magnet disposed opposite to the stator;

oil filled into a clearance between the shaft and the sleeve; and a fixing ring inserted into the frame housing to hold the sleeve against the seat.

2. A motor according to claim 1, wherein the sleeve is either inserted into the frame housing with a clearance of not more than 0.1 mm or press-fitted into the frame housing with an interference of not more than 5 $\mu$m.

3. A motor according to claim 1, wherein one end portion of the fixing ring is inclined inwardly.

4. A motor according to claim 1, wherein an end portion of the fixing ring that is in contact with the sleeve is inclined inwardly and has a serrated edge.

5. A motor according to claim 1, wherein dynamic pressure generating grooves to hold oil are formed in either an outer circumferential surface of the shaft or an inner circumferential surface of the sleeve.

6. A motor according to claim 1, wherein an oil pool is formed around a portion surrounding a mounting base of the shaft to receive oil scattered from between the shaft and the sleeve.

7. A heat sink apparatus comprising a cooling fan motor having a motor as claimed in claim 1, wherein a heated body can be mounted to a frame of the motor.

8. A heat sink apparatus according to claim 7, wherein plate-like fins are protrudingly formed on an inner side of the frame of the motor.

9. A heat sink apparatus according to claim 7, wherein one or more openings are formed in a side wall of the frame of the motor.

10. A motor comprising:

a frame having a frame housing;

a stator mounted to an outer circumference of the frame housing;

a shaft mounted inside the frame housing;

a rotor having a cup-shaped rotor housing and a magnet, the cup-shaped rotor housing having a seat formed inside, the magnet being disposed opposite to the stator;

a sleeve rotatably fitted over the shaft such that one end of the sleeve is supported on the seat inside the rotor housing;

oil filled into a clearance between the shaft and the sleeve; and a fixing ring inserted into the rotor housing to hold the sleeve against the seat.

11. A motor according to claim 10, wherein the sleeve is either inserted into the rotor housing with a clearance of not more than 0.1 mm or press-fitted into the rotor housing with an interference of not more than 5 $\mu$m.

12. A motor according to claim 10, wherein an end portion of the fixing ring that is in contact with the sleeve is inclined inwardly and has a serrated edge.

13. A motor according to claim 10, wherein dynamic pressure generating grooves to hold oil are formed in either an outer circumferential surface of the shaft or an inner circumferential surface of the sleeve.

14. A motor according to claim 10, wherein an oil pool is formed around a portion surrounding a mounting base of the shaft to receive oil scattered from between the shaft and the sleeve.

15. A heat sink apparatus comprising a cooling fan motor having a motor as claimed in claim 10, wherein a heated body can be mounted to a frame of the motor.

16. A motor comprising:

a frame having a frame housing with a seat being formed inside;

a stator mounted to an outer circumference of the frame housing;

a sleeve fitted into the frame housing such that one end of the sleeve is supported on the seat formed inside the frame housing;

a shaft rotatably fitted into the sleeve;

a rotor having an oil pool and a magnet, the oil pool being provided in a portion surrounding a mounting base of the shaft to receive oil, the magnet being disposed opposite to the stator;

oil filled into a clearance between the shaft and the sleeve; and a fixing ring inserted into the frame housing to hold the sleeve against the seat;

wherein a rib along an outer circumference of the oil pool faces an inner circumferential surface of the fixing ring with a predetermined clearance therebetween.

17. A motor according to claim 16, wherein the clearance between the rib along the outer circumference of the oil pool and the fixing ring is of 50–300 $\mu$m.

18. A heat sink apparatus comprising a cooling fan motor having a motor as claimed in claim 16, wherein a heated body can be mounted to a frame of the motor.

* * * * *